US006868687B2

(12) United States Patent
de Koeijer

(10) Patent No.: US 6,868,687 B2
(45) Date of Patent: Mar. 22, 2005

(54) ICE CREAM UNIT COMPRISING AT LEAST AN ICE CREAM MAKER COMBINED WITH AN ICE CREAM DISPLAY CABINET

(75) Inventor: Edwin de Koeijer, Amsterdam (NL)

(73) Assignee: Marc van Houtven (BE)

( * ) Notice: Subject to any disclaimer, the term of this patent is extended or adjusted under 35 U.S.C. 154(b) by 0 days.

(21) Appl. No.: 10/450,053

(22) PCT Filed: Dec. 10, 2001

(86) PCT No.: PCT/NL01/00897

§ 371 (c)(1),
(2), (4) Date: Jun. 10, 2003

(87) PCT Pub. No.: WO02/47516

PCT Pub. Date: Jun. 20, 2002

(65) Prior Publication Data

US 2004/0050091 A1 Mar. 18, 2004

(30) Foreign Application Priority Data

Dec. 11, 2000 (NL) .............................................. 101684

(51) Int. Cl.[7] .................................................. A47F 3/04
(52) U.S. Cl. .................... 62/246; 62/342; 222/146.6
(58) Field of Search ................... 62/246–256, 342–343; 222/146.6

(56) References Cited

U.S. PATENT DOCUMENTS

| 1,704,590 A | 3/1929 | Cohen | |
| 3,797,268 A | * 3/1974 | Garavelli | 62/258 |
| 4,154,027 A | 5/1979 | Searcy | |
| 4,441,334 A | * 4/1984 | Cipelletti | 62/258 |
| 5,680,769 A | * 10/1997 | Katz | 62/68 |
| 6,082,130 A | 7/2000 | Pastryk et al. | |

FOREIGN PATENT DOCUMENTS

| EP | 1 020 149 | 3/1929 |
| EP | 0 782 824 | 7/1997 |
| FR | 655 058 | 4/1929 |
| FR | 1 024 471 | 4/1953 |

* cited by examiner

*Primary Examiner*—William E. Tapolcai
(74) *Attorney, Agent, or Firm*—Keusey, Tutunjian & Bitetto, P.C.

(57) ABSTRACT

An ice cream machine, at least including an assembly of an ice cream preparation unit and an ice cream display cabinet, in which the ice cream preparation unit includes an ingredient inlet, ice cream preparation unit and an ice cream outlet, and the ice cream display cabinet includes refrigeration unit and is designed for refrigerating ice cream in one or more ice cream containers. The space above the ice cream containers in the ice cream display cabinet can also be refrigerated, while the ice cream outlet of the ice cream preparation unit opens directly into the ice cream display cabinet.

12 Claims, 1 Drawing Sheet

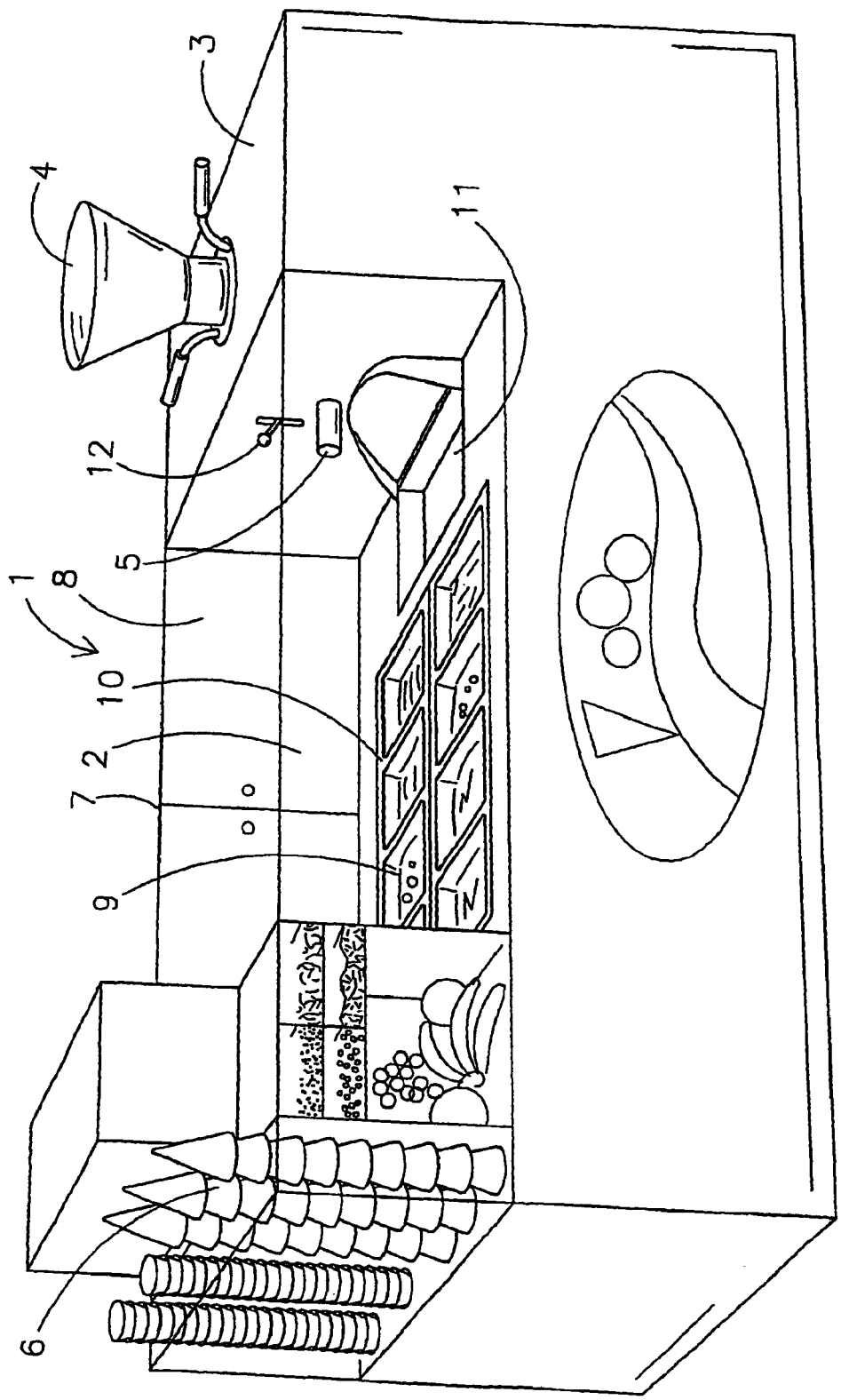

ICE CREAM UNIT COMPRISING AT LEAST AN ICE CREAM MAKER COMBINED WITH AN ICE CREAM DISPLAY CABINET

TECHNICAL FIELD OF THE INVENTION

The present invention relates to an ice cream machine.

DESCRIPTION OF RELATED ART

Many types of ice cream machines are known in the prior art. All these known ice cream machines have the major disadvantage that if the ice cream is being prepared at the point of sale, this ice cream always comes into contact with the outside air before it is transferred to a refrigerated ice cream display cabinet. Through contact with the outside air, the ice cream can be contaminated with microorganisms or may deteriorate in quality in another way. There is also the risk of the ice cream melting slightly because of the generally considerably higher ambient temperature, which is, of course, undesirable. Finally, it often happens that while it is being transported by a user from the ice cream preparation unit to the ice cream display cabinet the ice cream accidentally falls down and is subsequently completely unfit for consumption.

Until now no satisfactory solution has been found to the abovementioned problems.

SUMMARY OF THE INVENTION

The object of the present invention is to solve the abovementioned problems and provide a generally improved ice cream machine. According to the invention, the ice cream machine comprises at least an assembly of an ice cream preparation unit and an ice cream display cabinet, in which the ice cream preparation unit comprises an ingredient inlet, ice cream preparation means and an ice cream outlet, and the ice cream display cabinet comprises refrigeration means and is designed for refrigerating ice cream in one or more ice cream containers, and the space above the ice cream containers in the ice cream display cabinet can also be refrigerated, while the ice cream outlet of the ice cream preparation unit opens directly into the ice cream display cabinet.

BRIEF DESCRIPTION OF THE DRAWINGS

FIG. 1 shows a diagrammatic perspective view of an ice cream machine according to an aspect of the invention.

DETAILED DESCRIPTION OF PREFERRED EMBODIMENTS

With the ice cream machine according to the invention, the ready, freshly prepared ice cream can therefore be dispensed directly into the ice cream containers in the ice cream display cabinet, without coming into contact with the outside air. Moreover, there is no longer any risk at all of an ice cream container or loose ice cream falling down.

The ice cream display cabinet advantageously comprises a fully closed and refrigerated space into which the ice cream outlet of the preparation unit opens. More advantageously, the ice cream is visible in the ice cream display cabinet from the outside. For that purpose, the ice cream display cabinet comprises, for example, a transparent plastic or glass cover. It will be clear that for commercial reasons this has advantages.

As ice cream, any ice cream or mixtures thereof may be used. In this respect it is noted that according to the present invention, 'ice cream' does not include ice cubes.

In the ice cream machine according to the invention, the ice cream preparation unit is not limited either, provided that its outlet can open directly into the ice cream display cabinet, in order to avoid any contact of ready ice cream with the environment. Many types of ice cream preparation units are known in the prior art.

Finally, the ice cream display cabinet in the ice cream machine according to the invention is limited only by the fact that the ice cream outlet of the ice cream preparation unit opens into the cold space of the ice cream display cabinet. In practice cream, such ice cream display cabinets are refrigerated to temperatures well below freezing point, generally to approximately −14° C.

The ice cream display cabinet preferably comprises means for supporting a container to be filled below the ice cream outlet of the ice cream preparation unit. In this way a ready quantity of ice cream can be transferred in a reliable and reproducible manner from the ice cream preparation unit to an ice cream container.

In a special embodiment the ice cream display cabinet comprises guide means along which the ice cream containers can be slid in the ice cream display cabinet. This provides the possibility of arranging the ice cream containers without all too great effort, since said containers in this case can easily be slid relative to each other in the guide means. Moreover, in this way the container to be filled is also easy to slide below the ice cream outlet.

The ice cream machine preferably comprises two or more ice cream preparation units, the corresponding ice cream outlets of which open directly into the ice cream display cabinet. In this case two or more flavours of ice cream can be prepared simultaneously.

It has been found that, apart from the advantages mentioned earlier, the consumer finds it appealing to be able to observe the preparation of the ice cream and the placing of the ice cream in the ice cream containers as a whole.

In particular, the one or more ice cream preparation units and the ice cream display cabinets have a common housing. This has the advantage that essential parts, such as, for example, the refrigeration means of the ice cream display cabinet and the ice cream preparation unit, and also the inlets and the like, can be connected to each other. Furthermore, in that case the ice cream machine can easily be positioned or moved as one unit.

The invention will be explained in greater detail below with reference to the appended drawing (FIG. 1), in which the single figure shows a diagrammatic view in perspective of an ice cream machine according to the invention.

The ice cream machine 1 comprises an ice cream display cabinet 2 and an ice cream preparation unit 3. The ice cream preparation unit 3 comprises an inlet funnel 4 for ice cream ingredients and an ice cream outlet 5. The ice cream outlet 5 opens directly into the display cabinet 2.

Next to the display cabinet, a storage section 6 is also present, containing ice cream-cream cones, fruits, sweets and the like, for example for garnishing the ice cream.

The ice cream machine 1 comprises a glass cover 7, which can be opened at the back by means of sliding windows 8. The display cabinet 2 also contains in this case eight ice cream containers 9, in which various flavours of scoop ice cream are present.

Situated below the ice cream containers 9 in the ice cream display cabinet 2 is a refrigeration unit, which keeps the ice cream containers and the space inside the glass cover 7 at a temperature below freezing point, in particular a temperature of approximately −14° C.

The ice cream containers 9 are situated in a support 10 in the ice cream display cabinet 2 and can be removed from it.

A recess 11, in which an empty ice cream container 9 can be placed, is situated below the ice cream outlet aperture 5. The ice cream outlet aperture can be operated by means of a slide 12. In this way ice cream can be dispensed in a simple manner from the ice cream preparation unit 3 into the ice cream containers.

It can be seen clearly in this figure that both the ice cream preparation unit 3 and the ice cream display cabinet 2 are situated in a common housing. This has many advantages; for example, the power supplies and possibly the refrigeration means of the ice cream display cabinet and the ice cream preparation unit can be connected to each other, and the assembly can be moved as one unit.

For the sake of simplicity, the refrigeration means and the ice cream preparation means, inter alia, are not shown in the figure, because in the prior art these are generally known components, which can be selected as desired.

What is claimed is:

1. An ice cream machine comprising an assembly of an ice cream preparation unit and an ice cream display cabinet, in which the ice cream preparation unit comprises an ingredient inlet, ice cream preparation means and an ice cream outlet, and the ice cream display cabinet comprises refrigeration means and is designed for refrigerating ice cream in one or more ice cream containers, and a space above the ice cream containers in the ice cream display cabinet can also be refrigerated, while the ice cream outlet of the ice cream preparation unit opens directly into the ice cream display cabinet, wherein the ice cream display cabinet comprises a refrigerated space into which the ice cream outlet of the ice cream preparation unit also opens.

2. The ice cream machine according to claim 1, wherein the ice cream display cabinet comprises means for supporting a container to be filled below the ice cream outlet of the ice cream preparation unit.

3. The ice cream machine according to claim 1, wherein the ice cream display cabinet comprises guide means along which the ice cream containers can be slid in the ice cream display cabinet.

4. The ice cream machine according to claim 1, wherein the ice cream machine comprises two or more ice cream preparation units, the corresponding ice cream outlets of which open directly into the ice cream display cabinet.

5. The ice cream machine according to claim 1, wherein the one or more ice cream preparation units and the ice cream display cabinet have a common housing.

6. The ice cream machine according to claim 2, wherein the ice cream display cabinet comprises guide means along which the container to be filled is slid to be positioned below the ice cream outlet.

7. An apparatus for preparing and displaying ice cream comprising:
   a display cabinet having a refrigeration means therein; and
   at least one ice cream preparation unit having an ingredients inlet and an ice cream outlet for dispensing prepared ice cream, wherein the ice cream outlet opens directly into the display cabinet, and wherein the display cabinet comprises an enclosed and fully refrigerated space into which the ice cream outlet of the at least one ice cream preparation unit opens.

8. The apparatus of claim 7, wherein the display cabinet includes at least one container for displaying the ice cream.

9. The apparatus of claim 7, wherein the ice cream display cabinet comprises a recess for holding at least one container beneath the ice cream outlet to be filled with the ice cream.

10. The apparatus of claim 9, wherein the ice cream display cabinet comprises guide means along which the at least one container to be filled is slid to be proportioned below the ice cream outlet.

11. The apparatus of claim 7, wherein the display cabinet and the ice cream preparation unit have a common housing.

12. The apparatus of claim 7, wherein the display cabinet comprises guide means along which a container can be slid in the display cabinet.

* * * * *